US011900071B2

(12) United States Patent
Paul et al.

(10) Patent No.: US 11,900,071 B2
(45) Date of Patent: Feb. 13, 2024

(54) GENERATING CUSTOMIZED DIGITAL DOCUMENTS USING ARTIFICIAL INTELLIGENCE

(71) Applicant: FMR LLC, Boston, MA (US)

(72) Inventors: Arindam Paul, Bangalore (IN); Angela Kontos, Malden, MA (US); Rachna Saxena, Bangalore (IN); Santhosh Kolloju, Suryapet (IN); Arijit Saha, Bangalore (IN); Aaditya Mathur, Bangalore (IN); Pavan Mohan, Rajarajeshwari Nagar (IN); Mohamed Asif Khan, Bangalore (IN)

(73) Assignee: FMR LLC, Boston, MA (US)

( * ) Notice: Subject to any disclaimer, the term of this patent is extended or adjusted under 35 U.S.C. 154(b) by 352 days.

(21) Appl. No.: 17/333,387

(22) Filed: May 28, 2021

(65) Prior Publication Data
US 2021/0374360 A1    Dec. 2, 2021

Related U.S. Application Data

(60) Provisional application No. 63/032,390, filed on May 29, 2020.

(51) Int. Cl.
*G06F 40/56*     (2020.01)
*G06N 3/08*      (2023.01)
*G06F 40/284*    (2020.01)

(52) U.S. Cl.
CPC .......... *G06F 40/56* (2020.01); *G06F 40/284* (2020.01); *G06N 3/08* (2013.01)

(58) Field of Classification Search
CPC ......... G06F 40/56; G06F 40/284; G06N 3/08; G06N 3/045; G06N 3/084
See application file for complete search history.

(56) References Cited

U.S. PATENT DOCUMENTS 10,095,692 B2   10/2018   Song et al.
10,114,798 B2   10/2018   Padawer
(Continued)

OTHER PUBLICATIONS

Vaswani, A. et al., "Attention Is All You Need," 31st Conference on Neural Information Processing Systems (NIPS 2017), Long Beach, CA, Dec. 6, 2017, available from https://arxiv.org/pdf/1706.03762, 15 pages.

*Primary Examiner* — Linda Wong
(74) *Attorney, Agent, or Firm* — Cesari & McKenna, LLP

(57) ABSTRACT

Methods and apparatuses are described in which unstructured computer text is analyzed for generation of customized digital documents. A server tokenizes and encodes historical user interactions and historical digital documents into multidimensional vectors. The server trains an interaction classification model using the multidimensional vectors as input to generate a classification for an input user interaction, and trains a language generation model using the multidimensional vectors as input to generate a customized digital document based upon an input user interaction. The server receives a new user interaction and encodes the new user interaction into a new multidimensional vector. The server executes the trained interaction classification model using the new vector as input to generate a digital document classification. The server executes the trained language generation model using the new vector and the classification as input to generate a customized digital document.

24 Claims, 9 Drawing Sheets

(56) References Cited

U.S. PATENT DOCUMENTS

| | | | |
|---|---|---|---|
| 10,242,667 B2 | 3/2019 | Sharma et al. | |
| 11,024,329 B2 * | 6/2021 | Shinkawa | G10L 15/22 |
| 11,302,346 B2 * | 4/2022 | Perri | G10L 15/183 |
| 11,394,799 B2 † | 7/2022 | Jackson | |
| 11,645,660 B2 * | 5/2023 | Chopra | G06F 16/353 |
| | | | 704/270.1 |
| 2017/0358295 A1 | 12/2017 | Roux et al. | |
| 2019/0251165 A1 * | 8/2019 | Bachrach | G06N 3/084 |
| 2022/0230632 A1 * | 7/2022 | Maitra | A61B 5/7267 |

\* cited by examiner
† cited by third party

502 → Date: 2019-05-28    504 → User: Zelma Rice

Description

506 →
DESCRIPTION OF ISSUE: PTP wants check reissued for the month of January of this year. Check number 02800330917
RESEARCH COMPLETED: DBCS BG OLR
CUSTOMER REQUESTED OUTCOME (Please separately list participant's questions below):
Q: PTP wants check reissued to ACH

Resolution

ISSUE: PTP wants check reissued for the month of January of this year. Check number 02800330917
Q: PTP wants check reissued to ACH

RESEARCH

DBCS - The participant's account reflects an In Pay status for the CHI benefit source. A final calculation was initiated in the amount of $350.30 for a BCD of 10/01/2001.

XTRAC - Multiple INFO/OTHER W204886-08APR19 and W357325-06MAY19 work items were opened to mail the check outstanding notifications.

508 →
A CHECKA/STOP W436277-31MAY19 work item was opened to void the 01/01/2019 check as per the request.

Letter

Client Name: Health Initiatives    Participant Name: ZELMA RICE

Subject: Re: Health Initiatives Retirement Plan, the "Plan" W420608

Body:
Thank you for contacting the Retirement Service Center regarding your pension account. Please be informed that arrangements have been made to reissue the voided check in the amount of $350.30 dated January 1, 2019. This benefit will be issued as a check and will be mailed to your address on record on or about July 12, 2019.

☐ I acknowledge that the letter has been verified by me  ← 510

Date: 2016-01-27   User: Kim Kilroy description = """
ISSUE: \nCustomer received this pension as the result of a QDRO Alt Payee Participant Name, would like the details of what is owed on the pension loan the participant took, since in their QDRO it stated she would have to pay the loan back that he took out. She is waiting to know the balance and the instructions on how to pay it off in full Right now, she is having to give the money to her ex spouse for each payment She is also wondering if this would affect her in regards to taxes, since the loan is in his name Please see if we can give her the loan details, since she stated it was mentioned in the terms of divorce\n:
"""

research_notes = """
\nPer the attached checklist,\nAlternate Payee Award: 100% of Participant\'s vested Cash Balance account in the Bank of BankName Pension Plan of the Valuation Date\nOutstanding Loan Balance: "Include outstanding loan balance in the Participant;s total vested account abalcbe as of the valuation date specified in the QDRO?\n NO, do NOT include Loans\nPer the attached QDRO Paragraph 11:\n"In the event that Participant has an outstanding loan balance from the Plan as of the Valuation Date, the loan balance shall not be included for purposes of calculating the cash balance account balance of the Participant to be divided pursuant to this Order"\nDid not find any outstanding loan balances on AP\'s account (99201) in FPRS or WebBenefits No specific language in QDRO stating that AP would be responsible for outstanding Loans|
"""

FIG. 6

Date: 2016-02-15    User: Kim Kilroy letter = """Thank you for contacting the CLIENT NAME.

This letter is in response to your inquiry regarding paying outstanding loans per the terms of the Qualified Domestic Relations Order (QDRO). I/We have researched your request and per the terms of the QDRO you were awarded 100% of the participant's vested cash balance account as of the 02/02/2015 valuation date. Per this order any outstanding loan balances in the participant's total vested account was not included in the determination of your benefit and no outstanding loan balances were transferred to your account."""

FIG. 7

In [11]: tokenizer.tokenize("Fidelity is the oldest company")

Out[11]: ['F', 'idelity', 'Ġis', 'Ġthe', 'Ġoldest', 'Ġcompany']

802

In [17]: tokenizer.tokenize("he is the kindest person i have known")

Out[17]: ['he', 'Ġis', 'Ġthe', 'Ġkind', 'est', 'Ġperson', 'Ġi', 'Ġhave', 'Ġknown']

```
['ISS', 'UE', ',', 'G', ':', 'C', 'Customer', 'received', 'this', 'pension', 'as', 'the', 're', 'us', 'it', 'of',
'a', 'Go', 'DR', 'O', 'Alt', 'Pay', 'ee', 'Lisa', 'Key', 'ston', ',', 'would', 'like', 'the', 'details', 'Go
f', 'what', 'is', 'owed', 'on', 'the', 'pension', 'loan', 'the', 'participant', 'took', ',', 'Gsi', 'ince',
'in', 'their', 'GQ', 'DR', 'O', 'Git', 'stated', 'she', 'would', 'have', 'to', 'pay', 'the', 'loan', 'bac
k', 'that', 'he', 'took', 'out', 'she', 'is', 'wanting', 'to', 'know', 'the', 'balance', 'and', 'the',
'instructions', 'on', 'how', 'to', 'pay', 'it', 'off', 'in', 'full', 'right', 'now', ',', 'she', 'is',
'having', 'to', 'give', 'the', 'money', 'to', 'her', 'ex', 'spouse', 'for', 'each', 'payment', 'she', 'G
is', 'also', 'wondering', 'if', 'this', 'would', 'affect', 'her', 'in', 'regards', 'to', 'taxes', ',', 's
ince', 'the', 'loan', 'is', 'in', 'his', 'name', 'please', 'see', 'if', 'we', 'can', 'give', 'her', 'th
e', 'loan', 'details', ',', ',', 'since', 'she', 'stated', 'it', 'was', 'mentioned', 'in', 'the', 'terms', 'Go
f', 'divorce', 'C', '.']

[16744, 8924, 25, 220, 198, 44939, 2722, 428, 13553, 355, 262, 302, 385, 2528, 286, 257, 1195, 7707, 46, 12344, 7119,
1453, 15378, 7383, 3743, 11, 561, 588, 262, 3307, 318, 21057, 319, 262, 13553, 8063, 262, 18399, 1718, 11,
33721, 924, 287, 511, 1195, 7707, 46, 340, 5081, 673, 423, 284, 1414, 262, 8063, 736, 326, 339, 1718, 503, 1375,
318, 10291, 284, 760, 262, 5236, 290, 262, 7729, 319, 703, 284, 1414, 340, 572, 287, 1336, 6498, 783, 11, 673, 318, 1
719, 284, 1577, 262, 1637, 284, 607, 409, 16731, 329, 1123, 6074, 1375, 318, 635, 11263, 611, 428, 561, 2689, 607, 28
7, 13957, 284, 5704, 11, 1201, 262, 8063, 318, 287, 465, 1438, 4222, 766, 611, 356, 460, 1577, 607, 262, 8063, 3307,
11, 1201, 673, 5081, 340, 373, 4750, 287, 262, 2846, 286, 1309, 198, 25]
```

902

904

GENERATING CUSTOMIZED DIGITAL DOCUMENTS USING ARTIFICIAL INTELLIGENCE

RELATED APPLICATIONS

This application claims priority to U.S. Provisional Patent Application No. 63/032,390, filed on May 29, 2020, the entirety of which is incorporated herein by reference.

TECHNICAL FIELD

This application relates generally to methods and apparatuses, including computer program products, for generating customized digital documents using artificial intelligence.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. In one example, unstructured computer text can relate to a user interaction between, e.g., a customer and a business that provides services to the customer. When the customer contacts the business regarding a request for information, a request for services, a problem or other type of contact, the business may electronically capture certain information about the user interaction as unstructured computer text and store this data in a database, in order to both document the context and substance of the customer inquiry and to record the outcome or resolution of the inquiry.

Part of the resolution process can be the issuance of a digital document to the customer that summarizes the user interaction and/or provides information to the customer relating to the user interaction. For example, the business may want to (or may be legally required to) issue a written communication (e.g., email, letter) to the customer that is customized to the specific recipient and is based upon the data captured as part of the user interaction. Not only must the communication be customized for the particular recipient and interaction, the grammar, structure, and substance of the communication must be correct and able to be understood. Requiring agents to manually generate these letters (even with the help of document templates) is too time-consuming and inefficient.

Furthermore, existing computerized automated document creation tools, even those based upon basic artificial intelligence (AI) techniques, generally do not provide satisfactory results in this regard. Generally, these tools lack the capability of producing communications that are accurate and customized for the end recipient without seeming like a form fill of a template, which can be disjointed and result in a communication that is not easily understood by the reader. In addition, these tools generally cannot leverage a historical corpus of domain-specific digital documents that were generated from historical user interactions in order to intelligently and automatically create new customized digital documents that are accurate and correct.

SUMMARY

Therefore, what is needed are methods and systems for creating customized digital documents using advanced AI techniques, where historical user interaction data and the corresponding digital documents that resulted from the historical user interaction data are analyzed to train and execute complex natural language generation models, which automatically produce customized digital documents without employing standard form document templates.

The invention, in one aspect, features a system used in a computing environment in which unstructured computer text is analyzed for generation of customized digital documents. The system comprises a computer data store including (i) a plurality of historical user interactions each associated with a user, each historical user interaction comprising a plurality of data fields, and (ii) a plurality of historical digital documents corresponding to the plurality of historical user interactions, each historical digital document comprising a corpus of unstructured computer text. The system further comprises a server computing device in communication with the computer data store, the server computing device comprising a memory to store computer-executable instructions and a processor that executes the computer-executable instructions. The server computing device tokenizes each historical user interaction and each historical digital document into a set of tokens using a byte pair encoder. The server computing device encodes each set of tokens for the historical user interaction and the historical digital document into a multidimensional vector. The server computing device trains an interaction classification model using the multidimensional vectors as input, the trained interaction classification model configured to generate a digital document classification for an input user interaction. The server computing device trains a language generation model using the multidimensional vectors as input, the trained language generation model configured to generate a customized digital document based upon an input user interaction. The server computing device receives a new user interaction associated with a user of a client computing device, the new user interaction comprising a plurality of data fields. The server computing device tokenizes the new user interaction into a new set of tokens and encodes the new set of tokens into a new multidimensional vector. The server computing device executes the trained interaction classification model using the new multidimensional vector as input to generate a digital document classification for the new multidimensional vector. The server computing device executes the trained language generation model using the new multidimensional vector and the digital document classification for the new multidimensional vector as input to generate a customized digital document for the user of the client computing device. The server computing device transmits the customized digital document to the client computing device for display to the user of the client computing device.

The invention, in another aspect, features a computerized method in which unstructured computer text is analyzed for generation of customized digital documents. A server computing device receives, from a computer data store, (i) a plurality of historical user interactions each associated with a user, each historical user interaction comprising a plurality of data fields, and (ii) a plurality of historical digital documents corresponding to the plurality of historical user interactions, each historical digital document comprising a corpus of unstructured computer text. The server computing device tokenizes each historical user interaction and each historical digital document into a set of tokens using a byte pair encoder. The server computing device encodes each set of tokens for the historical user interaction and the historical digital document into a multidimensional vector. The server computing device trains an interaction classification model using the multidimensional vectors as input, the trained interaction classification model configured to generate a digital document classification for an input user interaction. The server computing device trains a language generation model using the multidimensional vectors as input, the trained language generation model configured to generate a customized digital document based upon an input user interaction. The server computing device receives a new user interaction associated with a user of a client computing device, the new user interaction comprising a plurality of data fields. The server computing device tokenizes the new user interaction into a new set of tokens and encodes the new set of tokens into a new multidimensional vector. The server computing device executes the trained interaction classification model using the new multidimensional vector as input to generate a digital document classification for the new multidimensional vector. The server computing device executes the trained language generation model using the new multidimensional vector and the digital document classification for the new multidimensional vector as input to generate a customized digital document for the user of the client computing device. The server computing device transmits the customized digital document to the client computing device for display to the user of the client computing device.

Any of the above aspects can include one or more of the following features. In some embodiments, encoding each set of tokens for the historical user interaction and the historical digital document into a multidimensional vector comprises one or more of: removing one or more stopwords from the historical user interaction or the historical digital document, or removing one or more symbols or digits from the historical user interaction or the historical digital document. In some embodiments, the historical user interaction comprises a plurality of data fields including a description field, a resolution field, a client name field, and a date field. In some embodiments, the server computing device uses a word embedding algorithm to encode each set of tokens for the historical user interaction and the historical digital document.

In some embodiments, the interaction classification model comprises a neural network having an input layer, one or more hidden layers, and an output layer. In some embodiments, encoding the new set of tokens for the new user interaction into a multidimensional vector comprises one or more of: removing one or more stopwords from the new user interaction, or removing one or more symbols or digits from the new user interaction. In some embodiments, the new user interaction comprises a plurality of data fields including a description field, a resolution field, a client name field, and a date field. In some embodiments, the server computing device uses a word embedding algorithm to encode the new set of tokens for the new user interaction.

In some embodiments, executing the trained interaction classification model using the new multidimensional vector as input to generate a digital document classification for the new multidimensional vector comprises: predicting a classification score for the new user interaction based upon one or more features of the new multidimensional vector; and assigning a digital document classification to the new user interaction based upon the classification score. In some embodiments, executing the trained language generation model using the new multidimensional vector and the digital document classification for the new multidimensional vector as input to generate a customized digital document for the user of the client computing device comprises: determining a sequence of words that comprise the customized digital document based upon the new multidimensional vector, including selecting a plurality of candidate words to be included as a next word in the sequence of words and determining the next word in the sequence of words by evaluating a score associated with each candidate word. In some embodiments, the language generation model is a generative pretrained transformer. In some embodiments, the language generation model is trained using transfer learning techniques based upon a corpus of unstructured computer text from a different domain than the historical digital documents.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of an exemplary screenshot of a user interface of a software application for generating customized digital documents.

FIG. 6 is exemplary historical user interaction data provided to the server computing device.

FIG. 7 is exemplary historical digital document data provided to the server computing device.

FIG. 8 is an example of tokenization of unstructured computer text as performed by the server computing device.

FIG. 9 is an example of tokenization and encoding of unstructured computer text as performed by the server computing device.

DETAILED DESCRIPTION

Figure 1:
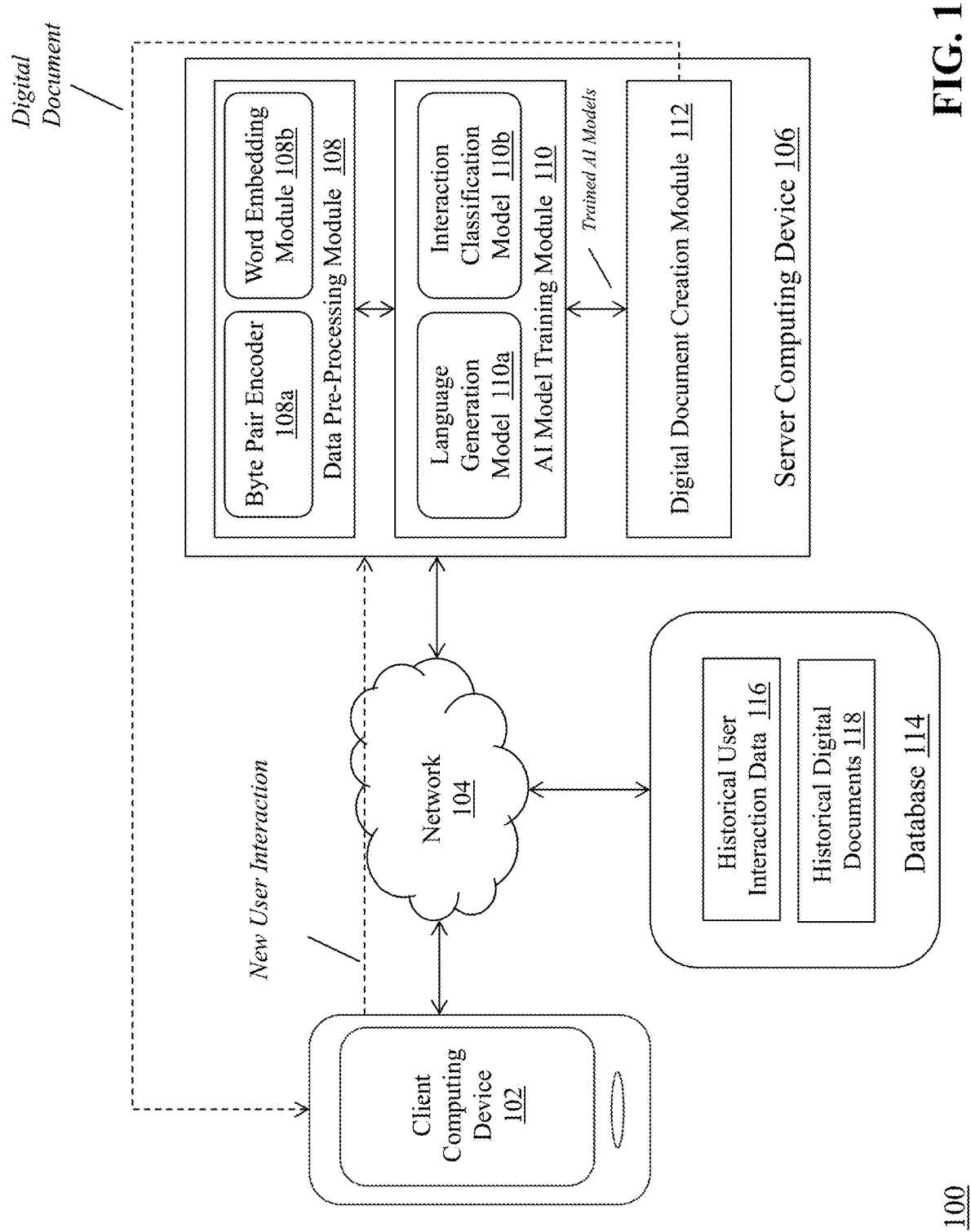
FIG. 1 is a block diagram of a system in which unstructured computer text is analyzed for generating customized digital documents using artificial intelligence.

FIG. 1 is a block diagram of a system 100 in which unstructured computer text is analyzed for generating customized digital documents using artificial intelligence (AI). The system 100 includes a client computing device 102, a communications network 104, a server computing device 106 that includes a data pre-processing module 108 with a byte pair encoder 108a and a word embedding module 108b, an AI model training module 110 with a language generation model 110a and an interaction classification model 110b, and a digital document creation module 112, and a database 114 that includes historical user interaction data 116 and historical digital documents 118.

The client computing device 102 connects to the communications network 104 in order to communicate with the server computing device 106 to provide input and receive output relating to the process of for generating customized digital documents using artificial intelligence as described herein. The client computing device 102 is coupled to a display device (not shown). For example, client computing device 102 can provide a graphical user interface (GUI) via the display device that presents output resulting from the methods and systems described herein. In some embodiments, the client computing device 102 is operated by an end user (e.g., a customer using the device 102 to receive digital documents from the server computing device 106 which can be operated by a business or other entity with which the customer has a relationship) while in other embodiments, the client computing device 102 is operated by a customer service representative (e.g., an agent that is employed by a business or other entity and generates digital documents for customers or clients of the business).

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The communications network 104 enables the client computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 a device including specialized hardware and/or software modules that execute on a processor and interact with memory modules of the server computing device 106, to receive data from other components of the system 100, transmit data to other components of the system 100, and perform functions for generating customized digital documents using artificial intelligence as described herein. The server computing device 106 includes several computing modules 108, 110, 112 that execute on the processor of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

The database 114 is a computing device (or in some embodiments, a set of computing devices) coupled to the server computing device 106 and is configured to receive, generate, and store specific segments of data relating to the process of generating customized digital documents using artificial intelligence as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 114 is My SQL™ available from Oracle Corp. of Redwood City, California.

The database 114 includes historical user interaction data 116 and historical digital documents 118, each of which in some embodiments is a dedicated section of the database 114 that contains specialized data used by the other components of the system 110 to perform the process of generating customized digital documents using artificial intelligence as described herein. Generally, the historical user interaction data 116 comprises structured and/or unstructured computer text relating to one or more user interactions (e.g., customer service inquiries). For example, a user may call into a customer service center to obtain information, ask questions, and report problems associated with one or more services offered by a company to which the user is a customer. A customer service agent can respond to the user's inquiries, including recording relevant information about the user interaction (e.g., date, user identity, request/problem description, resolution description, etc.) in a computer data store (such as database 114). In another example, a user interaction record can be generated automatically by the system 100—for example, based upon a user's profile or account information, an automated reminder may be triggered to generate a digital document to the user regarding an upcoming deadline or notification message. In either example, this information can comprise a historical user interaction. In some embodiments, the historical digital documents 118 are related to the historical user interactions. For example, as a result of a user interaction, the company may want to generate a digital document (e.g., a letter) to the user that contains information about the user interaction and any applicable resolution that occurred. These generated digital documents can be stored in a computer data store (e.g., database 114) and can be associated with one or more historical user interactions—so that the system can understand what type(s) and/or attribute(s) of user interactions resulted in the generation of certain types of digital documents.

Figure 3:
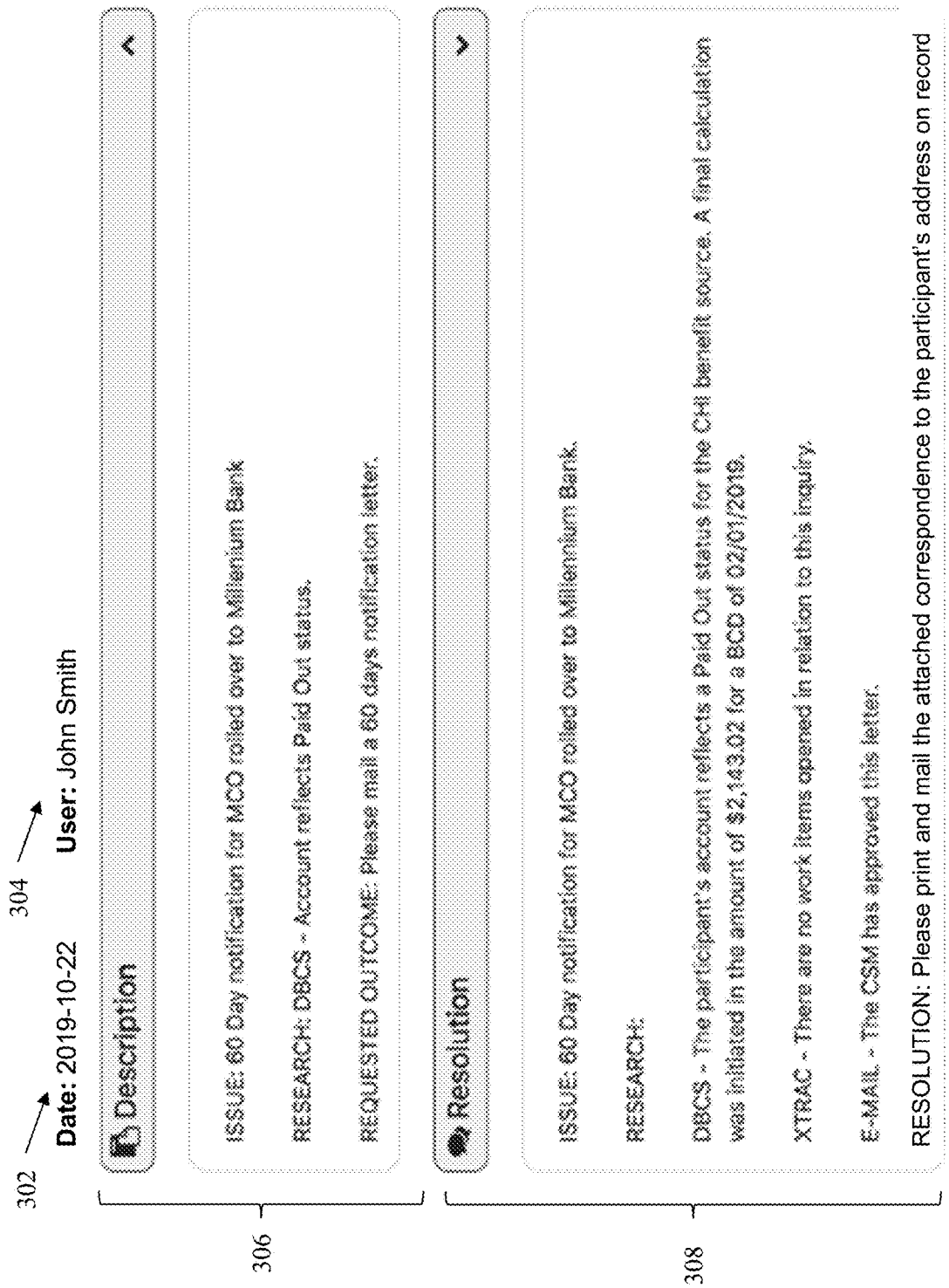
FIG. 3 is exemplary user interaction data provided to the server computing device.

FIG. 3 is exemplary user interaction data that is used by the server computing device 106. As shown in FIG. 3, the user interaction data comprises a date field 302, a user identity field 304, a description field 306, and a resolution field 308. The date field 302 contains the date on which the user interaction data was created and/or updated (e.g., when the resolution was completed). The user identity field 304 contains an identifier associated with the user that prompted the user interaction record to be created (e.g., the customer that called into the customer service center). In some embodiments, the user identity field 304 can be populated with a username, user ID number or other identifier that relates to the user's identity—in some cases, the user identifier can point to a separate user profile record stored in database 114 that comprises more detailed information about the user (e.g., demographic information, account information, interaction history information, etc.). In some embodiments, the user identity field 304 can be populated with the user's name (e.g., John Smith).

The description field 306 contains structured and/or unstructured computer text that corresponds to information associated with the reason for the user interaction. As shown in FIG. 3, the description field 306 includes issue, research, and requested outcome. In this example, the system 100 may determine that a 60-day notification letter should be mailed to the customer based upon, e.g., the fact that the customer's account reflects a paid out status (see Research information in the description field 306). The resolution field 308 contains structured and/or unstructured computer text that corresponds to information associated with an action item resulting from the reason for the user interaction. As shown in FIG. 3, the resolution field 308 includes the issue and research information, along with other information such as a resolution that indicates the action to be taken with respect to generating and transmitting the digital document. The system 100 can analyze this information to determine that a customized digital document (e.g., a letter) should be generated and transmitted to the customer (and/or a customer service agent) that contains information about the notification and the account status, among other items. As such, the system 100 can then automatically generate the customized document based upon the user interaction data.

Figure 4:
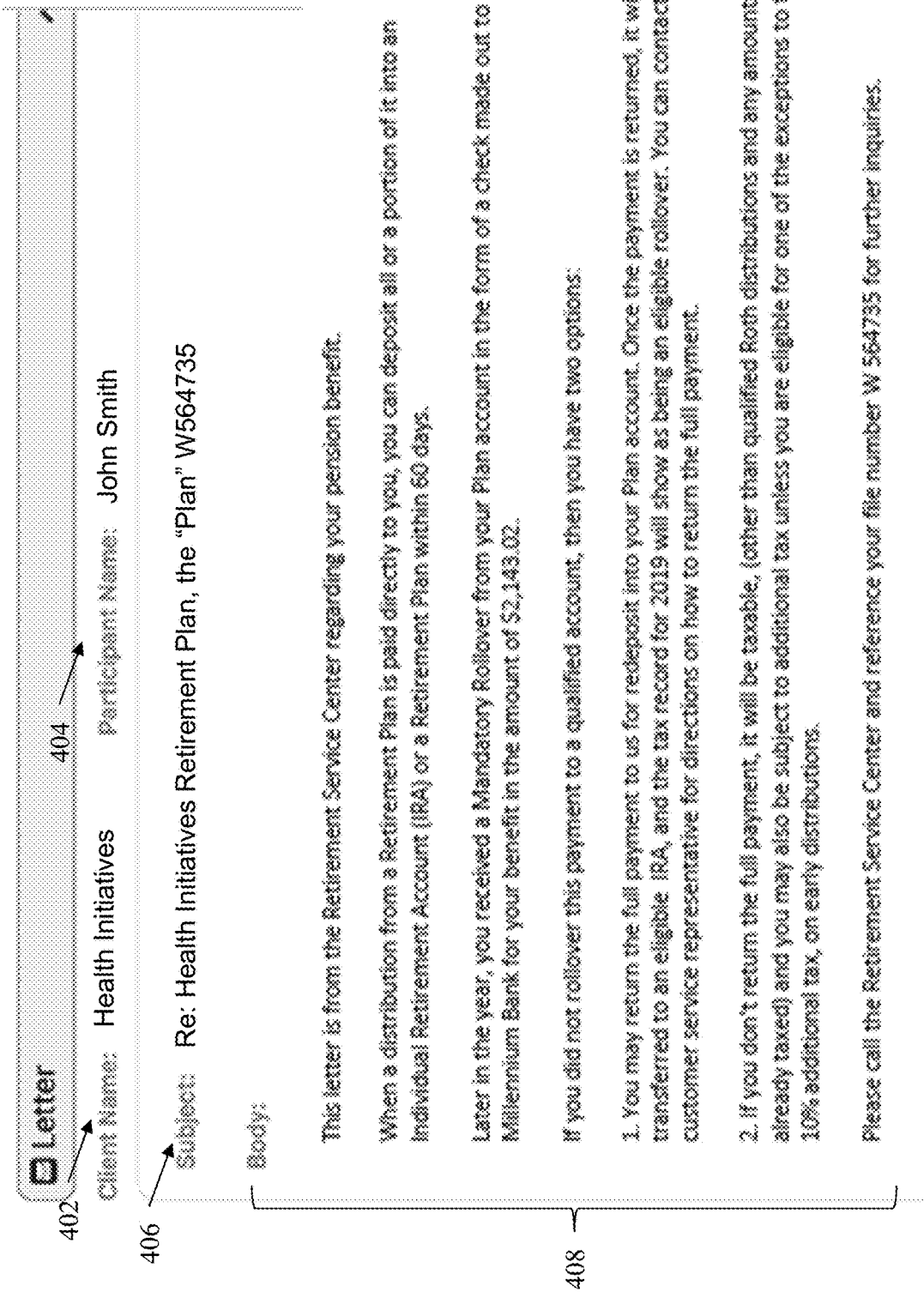
FIG. 4 is an exemplary customized digital document generated by the server computing device.

FIG. 4 is an exemplary customized digital document generated by the server computing device 106. As shown in FIG. 4, the customized digital document comprises a client name 402, a participant name 404, a subject 406, and a body 408. It should be appreciated that the document shown in FIG. 4 is an example, and that other formats, structures, and/or data fields can be included in the customized digital document without departing from the scope of the technology described herein. The customized digital document contains information relating to the corresponding user interaction shown in FIG. 3 (such as the name of the user, the account status, etc.), and is generated by the server computing device 106 in response to the user interaction. The server computing device 106 can then transmit the customized digital document to, e.g., a client computing device 102 of the customer and/or a client computing device of a customer service agent for display. It should be appreciated that the customized digital document can take any of a number of different forms, including but not limited to email, PDF, text message, and the like. In some embodiments, the customized digital document can be viewed by an intermediate user (such as a customer service agent or manager) to confirm accuracy of the content and/or completeness and correctness of the language and grammar in the document prior to transmission to the end recipient. Further detail on the historical user interaction data 116 and historical digital documents 118 is provided below.

Figure 2:
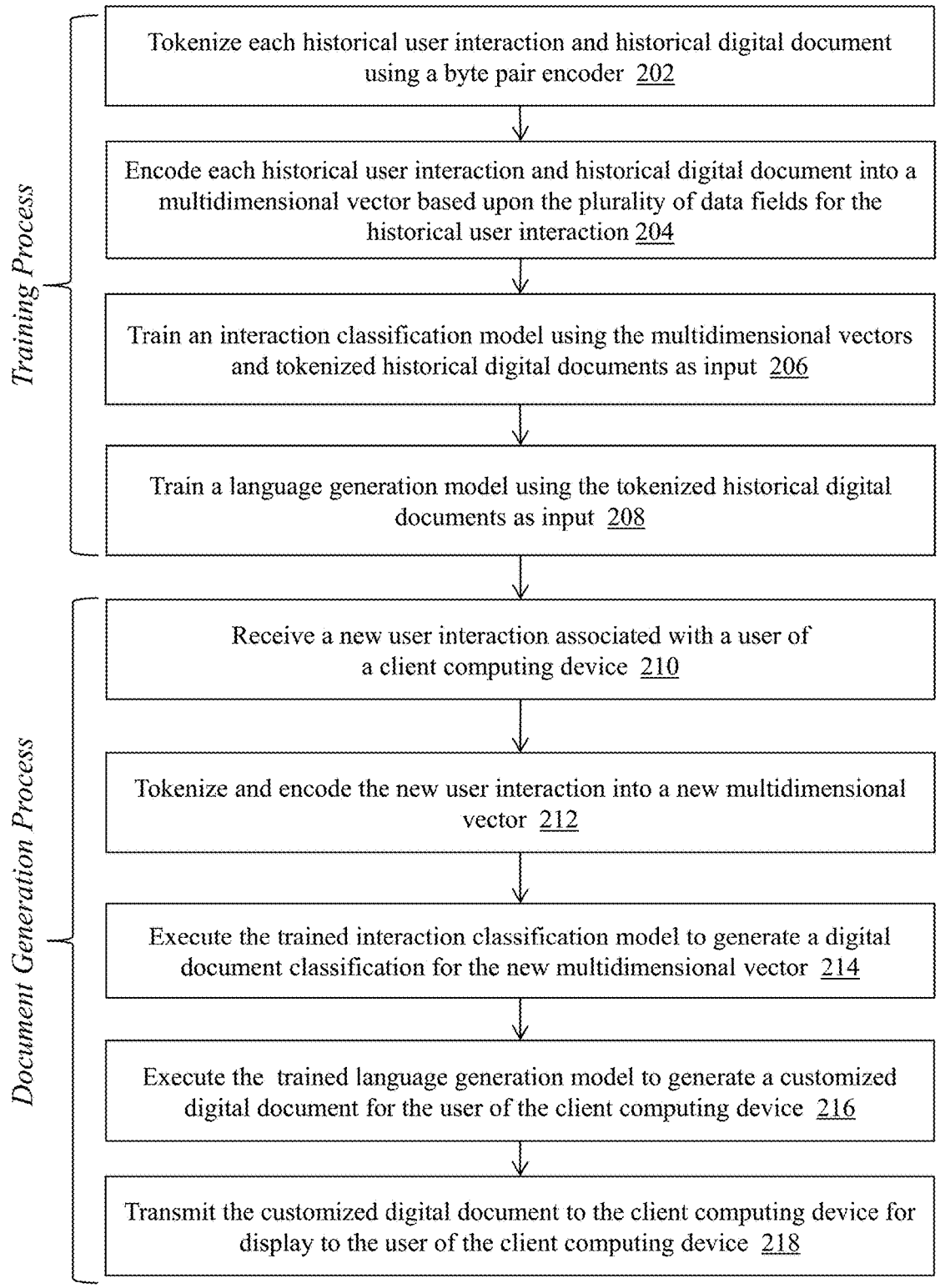
FIG. 2 is a flow diagram of a computerized method in which unstructured computer text is analyzed for generating customized digital documents using artificial intelligence.

FIG. 2 is a flow diagram of a computerized method 200 in which unstructured computer text is analyzed for generating customized digital documents using artificial intelligence, using the system 100 of FIG. 1. The first phase of the method 200 comprises a training process (i.e. steps 202-208), whereby the server computing device 106 analyzes a set of training data comprising computer text (i.e., the historical user interactions 116 and the historical digital documents 118 as stored in the database 114) to train language generation model 110a and interaction classification model 110b how to classify incoming user interactions in order to generate customized digital documents for users. Once the above models are trained, the server computing device 106 can use the trained models in a digital document creation process (i.e. steps 210-218) to classify newly-received user interactions in the form of structured and/or unstructured computer text (i.e., a new user interaction record generated by a customer service agent) received from client computing device 102, generate a customized digital document for a user of client device 102 based upon the unstructured computer text, and transmit the customized digital document to, e.g., the client computing device 102 for display. Further detail on the training process (steps 202-208) and model execution process (steps 210-218) is provided below.

During the training process, the data pre-processing module 108 of server computing device 106 receives the historical user interaction data 116 and historical digital documents 118 from the database 114. In addition to FIG. 3, another example of historical user interaction data 116 is set forth in FIG. 6, which is referred to in the following description of FIG. 2. As shown in FIG. 6, the historical user interaction data includes a date of interaction 602, a user name 604, a description 606, and research notes (or resolution) 608. Also, an example of a historical digital document 118 (e.g., a previously generated letter) is set forth in FIG. 7, which is referred to in the following description of FIG. 2. As shown in FIG. 7, the historical digital document 118 includes a date 702, a user name 704, and a letter body 706.

The data pre-processing module 108 tokenizes (202) each historical user interaction and historical digital document using a byte pair encoder 108a. As described above, each historical user interaction and historical digital document comprises a corpus of structured and/or unstructured computer text (e.g., text description) and the byte pair encoder 108a converts the corpus of computer text into a plurality of tokens that generally comprise subwords within the corpus of computer text, thus making it easier for the server computing device 106 to train the language generation model 110a. Exemplary byte pair encoder algorithms that can be used by the data pre-processing module 108 are described in R. Sennrich et al., "Neural Machine Translation of Rare Words with Subword Units, *Proceedings of the 54$^{th}$ Annual Meeting of the Association for Computational Linguistics*, August 2016 and A. Radford et al., "Language Models are Unsupervised Multitask Learners," OpenAI, 2019, both of which are incorporated herein by reference. It should be appreciated that other types of encoding and/or tokenization methodologies can be used within the scope of the technology described herein. FIG. 8 sets forth examples 802, 804 of how the data pre-processing module 108 can tokenize unstructured computer text. As shown in FIG. 8, the data pre-processing module 108 converts an input text corpus (e.g., "he is the kindest person I have known") into a set of tokens—typically based upon words or portions of words (e.g., "kindest" is tokenized into two tokens, "kind" and "est").

The data pre-processing module 108 encodes (204) each historical user interaction and each historical digital document into a multidimensional vector based upon the tokenization step. As can be appreciated, encoding the historical user interaction data (which comprises unstructured computer text) into a multidimensional vector (i.e., a vector of numerical values, each corresponding to a feature or attribute of the historical user interaction) enables the AI models described herein to understand the structure and context of the user interaction data. In one example, the data pre-processing module 108 uses the word embedding module 108b to convert the tokenized unstructured computer text of the historical user interaction data and the historical digital document data into a multidimensional vector capable of being used as input to train the interaction classification model 110b as described herein. Exemplary word embedding algorithms used by the word embedding module 108b include, but are not limited to, fastText™ available from fasttext.cc, Word2vec (available from deeplearning4j.org/word2vec), Glove (available from nlp.stanford.edu/projects/ glove). An example of how the data pre-processing module tokenizes and encodes the description from FIG. 6 into a multidimensional vector is set forth in FIG. 9. As shown in FIG. 9, the data pre-processing module 108 first tokenizes the unstructured computer text of the description 606 from FIG. 6—resulting in the set of tokens 902. Then, the data pre-processing module 108 encodes the set of tokens 902 into a multidimensional vector 904. In this example, the numeric values in the multidimensional vector 904 represent the index of the word in a predefined vocabulary. In one example, the vocabulary size can be 52,000, so the index value of any particular word would be between 1-52,000.

Example

If the vocabulary of words is: ["the", "how", "in", "are", "you", "doing"] (6 words);

Given a sentence "how are you doing," the data pre-processing module 108 tokenizes the sentence into the following set of tokens: ['how', 'are', 'you', 'doing'];

Then the data pre-processing module encodes the set of tokens into a multidimensional vector, where each token is assigned a value according to its index in the overall vocabulary, i.e., resulting in a vector of [2, 4, 5, 6].

Once the multidimensional vector is generated, the data pre-processing module 108 can utilize one or more embedding layers to augment the multidimensional vector. For example, the data pre-processing module can utilize a word embedding layer, a position embedding layer, and a segment embedding layer to generate a final multidimensional vector that is then used as input to the AI model training module 100. In some embodiments, a word embedding is an n-dimensional representation of each word, such that the word embedding layer is a learned linear layer which converts the one-hot encoded word of size 52,000 (i.e., the word vocabulary size) into a smaller dimension (e.g., 768). In some embodiments, a position embedding represents each word position by an n-dimensional vector of size, e.g., 768. The position embedding layer is also a linear layer learned during training. In some embodiments, a segment embedding layer reuses the learned linear layer of the word embedding layer and extracts an n-dimensional vector for special tokens—in this case, special tokens are added to the vocabulary and serve to differentiate between different fields of data; for example, the pre-processing module 108 can be configured to recognize the following special tokens:

<bos>—beginning of sentence
<eos>—end of sentence
<desc-text>—token representing start of description text
<res-text>—token representing start of resolution text.
<client-name>—token representing start of client name text.
<ptp-name>—token representing start of participant/user name text.
<work-date>—token representing start of work item text.
<letter-text>—token representing start of letter text.
<pad>—padding token In this way, the various inputs to the AI model training module 110 as mentioned above (e.g., multidimensional vectors for the historical user interaction data and the historical digital document) are aggregated into an input that uses the special tokens to separate each type of data:

input_to_model="<bos>"+"Jan. 27, 2016"+"<client-name>"+CLIENT NAME+"<ptp-name>"+PARTICIPANT NAME+"<desc_text>"+DESCRIPTION+"<res-text>"+RESEARCH NOTES+"<letter-text>"+LETTER For example, the input can have 1,024 words (i.e., combined description text+resolution text+client name+work date+participant name+special tokens). The data pre-processing module 108 generates a multidimensional vector for the word embedding layer (i.e., 1,024×768), a multidimensional vector for the position embedding layer (i.e., 1,024×768) and a multidimensional vector for the segment embedding layer (i.e., 1,024×768). Then the data pre-processing module 108 adds each of these multidimensional vectors together to generate a single vector of dimensions [1,024×768] which is used as input to the AI model training module 110.

The AI model training module 110 of server computing device 106 receives the pre-processed data (e.g., the input vector) as described above from the data pre-processing module 108, and the module 110 trains (206) an interaction classification model 110b using the multidimensional vectors and tokenized historical digital documents as input to generate a digital document classification for an input user interaction. In one example, the interaction classification model is a neural network that comprises a plurality of layers (e.g., input layer, one or more hidden layers, output layer) configured to receive as input the multidimensional vector and generate a digital document classification for the multidimensional vector based upon the corresponding tokenized historical digital document for that user interaction—that is, the model is configured to determine (or predict) a relationship between the features and/or attributes of the input user interaction vector and the corresponding digital document that had been generated. Generally, the model is measured by how accurately it can predict the output from the corresponding input—a less accurate model can be retrained using the same training data (and/or additional training data) in order to refine the model and make it more accurate.

The AI model training module 110 of server computing device 106 also trains (208) a language generation model 110a using the multidimensional vector from the pre-processing module 108 as input to generate a customized digital document based upon an input user interaction. In one example, the language generation model 110a is a Transformer-based model that is trained to automatically generate accurate, grammatically- and contextually-correct natural language documents based upon analysis of a corpus of text, including understanding the context of the words in the corpus of text and the relationships between words and sentences in the corpus of text. An exemplary description of the Transformer language generation model is provided by A. Vaswani et al., "Attention is All You Need," 31$^{st}$ Conference on Neural Information Processing Systems (NIPS 2017), Long Beach, CA, Dec. 6, 2017, which is incorporated herein by reference. In one example, the language generation model 110a is based on the GPT-2 model available from OpenAI (openai.com). Generally, the language generation model 110a uses the tokens generated from all of the historical digital documents to generate predictions of the next word in a document, given all of the previous words in the document.

As can be understood, the language generation model 110a comprises two parts: an encoder and a decoder, each of which may comprise modules that can be stacked on each other a plurality of times. The encoder and decoder generally comprise one or more attention layers (e.g., Multi-Head Attention) and a feed forward layer; the encoder receives the input values as embeddings or multidimensional vectors (e.g., generated from a tokenized historical digital document) and the decoder receives the output values as embeddings (e.g., generated from the completed sentences from the historical digital document). It should be appreciated that in some embodiments, the decoder input is shifted right by one position to enable the language generation model 110a to predict the next word in a sequence—versus merely copying an input. Notably, the embeddings also comprise positional encoding information that give every word/token in the sequence a relative position. In addition, the decoder input is appended with a start-of-sentence token to avoid an empty space at the start of the input due to the right shift, and appended with an end-of-sentence token to mark the end of the sequence.

In some embodiments, the encoder and decoder can comprise a Multi-Head Attention layer. Generally, multi-head attention is a variant of self-attention where multiple soft attention layers are run in parallel and their outputs are concatenated the end. Multi-head attention exists because it would be difficult to capture different aspects of the sentence with a single attention layer. For example, in the sentence "I like cats more than dogs" it is important to capture the fact that the sentence is comparing two entities while retaining the actual entities being captured. So multi-head attention calculates multiple weighted sum vectors instead of single attention pass over the values.

Transformer networks adopt an attention mechanism called scaled-dot product attention. It can be interpreted as a way of computing the relevance of values(V) based on some keys(K) and Queries(Q). The attention mechanism is a way to focus on the relevant information based on what the model is currently processing. Using a single attention head, it is difficult to capture all the concepts in a sentence which is why language generation model 110a uses multiple parallel attention heads (i.e., 12) with different parameters or different linear transformations to the keys, values, and query.

The following explains what happens inside a Attention layer:

Given the input vector of dimension [1024×768] (as mentioned above), the model 110a assigns the variables Q=K=V=[1024×768]. Three parameters are learned: Qw, Kw, Vw. These are parameters are matrices of dimensions [768×64]. The following matrix operations are performed to get a hidden representation for each word:

$$Q\hat{} = Qw*Q = [1024\times768]*[768\times64] = [1024\times64]$$

$$K\hat{} = Kw*K = [1024\times768]*[768\times64] = [1024\times64]$$

$$V\hat{} = Vw*V = [1024\times768]*[768\times64] = [1024\times64]$$

$$\text{Attention}(Q,K,V) = \text{softmax}(QKT/\sqrt{d})V$$

Attention is calculated as a dot product between Q^ and K^(transpose), which is a matrix which shows importance of each of 1024 words with others.

$$\text{Attention} = (Q\hat{}(\text{dot product})(K\hat{}))*V = [1024\times1024]*[1024\times64] = [1024\times64](\text{matrix multiplication}).$$

Then the model 110a determines a hidden representation of dimension 64 for each word. The above operation is at a single attention head—because there are 12 such attention heads, on concatenating the output from all 12 heads the model 110a gets a final output of dimension [1024×768]. Once the model 110a determines the hidden representation of dimension 768 as output for each word, the representation is then passed to a embedding layer which gives a probability distribution over the vocabulary (e.g., 52,000) so the output of this would be [1024×52k]. For each word, the model 110a chooses the index with maximum probability (out of 52,000) as a predicted word.

In order to provide the decoder with correct shifted input, in some embodiments the AI model training module 110 uses the teacher forcing technique in the language generation model 110a. Generally, teacher forcing enables the module 110 to discard an output prediction (e.g., the next word in the sentence) based upon calculation of an error value. For example, if the model 110a predicts the next word in the sequence and the actual word (as seen in the historical digital document) is different, the AI model training module 110 can determine an error value associated with the difference, discard the predicted word based upon the error value, and replace it with the correct word from the known output. Then, the module 110 can feed the correct sequence as the shifted input into the decoder during the next time step, and in this way, the language generation model 110a quickly learns the correct sequence.

Another part of the training process for the language generation model 110a is determining cross entropy loss using the multidimensional vectors generated as output probabilities from the model 110a. Generally, cross entropy loss relates to how similar the output vector (i.e., the vector for the predicted next word) is compared to the actual vector (i.e., the vector for the actual word from the known correct output). In some embodiments, cross entropy loss is calculated as:

$$D(S, L) = -\sum_i L_i \log(S_i)$$

where S is the output vector (for example, a one-hot encoded label as generated by a softmax function of the model 110a) and L is the ground truth (the known correct output vector). The AI model training module 110 can then use the cross entropy loss calculation to update the weights in the language generation model 110a to result in more accurate predictions going forward.

For the cross entropy loss, the target distribution is a one-hot encoded vector of size 52,000 with value 1 at the word to be predicted and other indices having value 0. For example:

Assume the word vocabulary size is 10: ["are," "today," "how," "I," "think," "this," "that," "doing," "now", "you"].

A given training example is: "how are you doing."

As mentioned previously, an output from the model 110a is [4×10][length of input×vocabulary size]

And target distribution for word 1 ("how") is: [1,0, 0, 0, 0, 0, 0, 0, 0, 0]; because the next word to be predicted by the model 110a for the word how is "are," which is at index 1.

If the model 110a outputs probability distribution for word 1 as: [0.8, 0.1, 0.1, 0, 0, 0, 0, 0, 0, 0] (noting that the combined sum is always 1), this means the model 110a is predicting the word "are" as next word with a 60% probability.

Therefore, the loss for word 1=(1*log(0.8)+0*log(0.1)+ 0*log(0.1)+0*log(0.1)+0*log(0.1)+ . . . )=1*log(0.6)=0.09.

And the target distribution for word 2 ("are") is: [0, 0, 0, 0, 0, 0, 0, 0, 0, 1]; because the next word to be predicted for word how is "you" which is at index 10.

If the model 110a outputs probability distribution for word 2 as: [0.1, 0.1, 0, 0, 0.6, 0, 0, 0, 0, 0.2], this means the model 110a is predicting the word "you" as next word with a 20% probability.

Therefore, the loss for word 2=(0*log(0.1)+0*log(0.1)+ 0*log(0)+0*log(0)+0*log(0.6)+ . . . 1*log(0.2))=1* log(0.2)=0.6.

As can be appreciated, when the model is 80% confident in predicting the next word, the loss is low (i.e., 0.09) and when the model is 20% confident, the loss is very high (i.e., 0.6).

The model 110a can determine the overall loss as follows:

> Overall loss=(loss for word 1+loss for word 2+loss for word 3+ . . . loss for word n)/(vocabulary size).

Because the goal for the system 100 to automatically generate an optimal prediction for a letter given a description and related input, the model 100a can calculate loss only for the words in the letter segment. The above loss gets backpropagated to adjust the weights of the model 110a.

Also, it should be appreciated that in the above example even when the model 110a predicted the next word incorrectly as "think" with 60% probability (highest one), the model 110a can still pass the word "you" as input to the next time step.

Once the AI models are trained as described above, the AI model training module 110 makes the models available to the digital document creation module 112 for automatic generation of customized digital documents based upon newly-received user interaction data. In some embodiments, the digital document creation module 112 receives (210) a new user interaction (including at least a portion of the information as described above with respect to FIG. 3) from, e.g., client computing device 102. The new user interaction may be associated with a user of the client device 102 (e.g., a customer utilizing an automated help application), or in some embodiments, the new user interaction may be associated with a user other than the user of client device 102 (e.g., where a customer calls into a service center and an agent manually enters the relevant information for the new user interaction (see FIG. 3) into client computing device). The digital document creation module 112 provides the new user interaction data to the data pre-processing module 110 which encodes (212) the new user interaction data into a multidimensional vector (e.g., using the word embedding module 108b as described previously with respect to step 202).

The digital document creation module 112 executes (214) the trained interaction classification model 110b using the multidimensional vector generated from the new user interaction data as input, which classifies the multidimensional vector from the new user interaction data and generates a corresponding digital document classification—e.g., based upon what the trained model 110b has learned about historical user interactions and the features and attributes of the corresponding digital documents that were created from those historical user interactions, the model 110b predicts at least a portion of the features and attributes for a new digital document that best or most closely corresponds to the new user interaction. The digital document creation module 112 can then use the output vector from the trained interaction classification model 110b in creating the digital document via the trained language generation model 110a.

The digital document creation module 112 executes (216) the trained language generation model 110a using the using the new multidimensional vector and the digital document classification for the new multidimensional vector as input to generate a customized digital document for the user of the client computing device. As described above, the trained language generation model 110a is a Transformer-based model that can use teacher forcing to generate an input for the decoder. In step 216, the digital document creation module 112 uses the teacher forcing technique to provide the correct starting point for the generation of the customized digital document (in some embodiments, leveraging the historical digital documents that may be related to the digital document classification for the new user interaction). Then, the digital document creation module 112 generates the customized digital document (e.g., by predicting each next word in the customized digital document using the document as created so far for input, as described above).

It should be appreciated that, in some embodiments, the trained language generation model 110a determines a probability of a plurality of different candidate words as the 'predicted' next word in the customized digital document. Each of these different candidate words is assigned a probability value by the model 110a that indicates the strength or likelihood of that word being the 'correct' next word in the sequence. In order to select the next word for the customized digital document from the probability distribution, in some embodiments the digital document creation module 112 uses top-k sampling to sample from the top k probable words. Generally, top-k sampling relates to sorting the candidate words by probability value and then zeroing out the probability values for any words beyond the first k words. The k value can be set to any number of different values based upon the desired efficiency and quality tradeoffs. Generally, top-k sampling improves quality of the selected next word by removing words that are more likely to be incorrect or off-topic. In some embodiments, the digital document creation module 112 can use other sampling methodologies (such as greedy sampling or top-p sampling) to select the next word. For example, a greedy approach always selects she index with max probability in the output distribution as next word:

> If an output probability distribution for the current Word is [0.8, 0.1, 0.1, 0, 0, 0, 0, 0, 0, 0], a greedy approach always chooses the index with highest probability, that is, 0.8.
>
> In some embodiments, for top-k sampling:
> Given k as 5, top-k sampling initially sorts the output probability distribution by descending order and chooses an index randomly among the top five probabilities as next word.
>
> For example, if an output probability the distribution for current word is [0.8, 0.1, 0.1, 0, 0, 0, 0, 0, 0, 0] top-k always chooses the index among the top 5 probabilities (discarding 0). Therefore, in this example, the module 112 can end up selecting the word with 0.1 probability (due to the randomization), even though there is a word with 0.8 probability.

Typically, top-k sampling is used when a user requests to generate the document with different style/different way of writing.

As can be appreciated, the digital document creation module 112 can also leverage data from the new user interaction (e.g., user identity, date, description, resolution) to be inserted into the newly-created customized digital document. For example, the trained language generation model 110a can be configured to insert placeholders or variables that the digital document creation module 112 can then replace with data from the user interaction—such as account balance, transaction amount, etc. Using the example from FIGS. 3 and 4, the digital document creation module 112 can extract the amount ($2,143.02) from the resolution field of the user interaction, and insert the amount into the created digital document in a contextually-appropriate and correct place (i.e., the third paragraph of the letter that discusses the mandatory rollover).

Once the digital document creation module 112 has generated the customized digital document, the module 112 transmits (218) the customized digital document to the client computing device 102 (and/or, in some embodiments, to another computing device) for display to a user of client device 102. FIG. 5 is a diagram of an exemplary screenshot of a user interface of a software application used by a customer service agent to generate customized digital documents for, e.g., customers of a retirement plan. As shown in FIG. 5, the user interface includes the description field 502 and resolution field 504 (as discussed above with respect to FIG. 3) that includes information relating to a user interaction—in this case, a customer wants the company to reissue a benefit check. The system 100 captures the user interaction data as described previously and generates the customized digital document 506 (in this case, a letter) on the right-hand side of the user interface. The customer service agent can then review the customized digital document for accuracy and completeness and edit the document if necessary before, e.g., transmitting the document to the customer (for example, by using the email button 508) and/or downloading an electronic copy of the digital document (for example, by using the download button 510) for further transmission or processing.

In some embodiments, the user interface can include a regenerate function 512 that enables the user of the software application to automatically regenerate the customized digital document using the system 100 as described above. The regenerate function 512 allows for the creation of different styles, format, and/or context of customized digital documents as the AI models described herein are adjusted and improve over time.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for generation of customized digital documents, the system comprising:
   a computer data store including (i) a plurality of historical user interactions each associated with a user, each historical user interaction comprising a plurality of data fields, and (ii) a plurality of historical digital documents corresponding to the plurality of historical user interactions, each historical digital document comprising a corpus of unstructured computer text, and
   a server computing device in communication with the computer data store, the server computing device comprising a memory to store computer-executable instructions and a processor that executes the computer-executable instructions to:
   tokenize each historical user interaction and each historical digital document into a set of tokens using a byte pair encoder;
   encode each set of tokens for the historical user interaction and the historical digital document into a multidimensional vector;
   train an interaction classification model using the multidimensional vectors as input, the trained interaction classification model configured to generate a digital document classification for an input user interaction;
   train a language generation model using the multidimensional vectors as input, the trained language generation model configured to generate a customized digital document based upon an input user interaction;
   receive a new user interaction associated with a user of a client computing device;
   tokenize the new user interaction into a new set of tokens using a byte-pair encoder and encode the new set of tokens into a new multidimensional vector;
   execute the trained interaction classification model using the new multidimensional vector as input to generate a digital document classification for the new multidimensional vector;
   execute the trained language generation model using the new multidimensional vector and the digital document classification for the new multidimensional vector as input to generate a customized digital document for the user of the client computing device; and
   transmit the customized digital document to the client computing device for display to the user of the client computing device.

2. The system of claim 1, wherein encoding each set of tokens for the historical user interaction and the historical digital document into a multidimensional vector comprises one or more of:
   removing one or more stopwords from the historical user interaction or the historical digital document, or removing one or more symbols or digits from the historical user interaction or the historical digital document.

3. The system of claim 2, wherein the historical user interaction comprises a plurality of data fields including a description field, a resolution field, a client name field, and a date field.

4. The system of claim 3, wherein the server computing device uses a word embedding algorithm to encode each set of tokens from the historical user interaction and the historical digital document.

5. The system of claim 1, wherein the interaction classification model comprises a neural network having an input layer, one or more hidden layers, and an output layer.

6. The system of claim 1, wherein encoding the new user interaction into a multidimensional vector comprises one or more of: removing one or more stopwords from the new user interaction, or removing one or more symbols or digits from the new user interaction.

7. The system of claim 6, wherein the new user interaction comprises a plurality of data fields including a description field, a resolution field, a client name field, and a date field.

8. The system of claim 7, wherein the server computing device uses a word embedding algorithm to encode the new set of tokens into the new multidimensional vector.

9. The system of claim 1, wherein executing the trained interaction classification model using the new multidimensional vector as input to generate a digital document classification for the new multidimensional vector comprises:
predicting a classification score for the new user interaction based upon one or more features of the new multidimensional vector; and
assigning a digital document classification to the new user interaction based upon the classification score.

10. The system of claim 1, wherein executing the trained language generation model using the new multidimensional vector and the digital document classification for the new multidimensional vector as input to generate a customized digital document for the user of the client computing device comprises:
determining a sequence of words that comprise the customized digital document based upon the new multidimensional vector, including selecting a plurality of candidate words to be included as a next word in the sequence of words and determining the next word in the sequence of words by evaluating a score associated with each candidate word.

11. The system of claim 10, wherein the language generation model is a generative pretrained transformer.

12. The system of claim 1, wherein the language generation model is trained using transfer learning techniques based upon a corpus of unstructured computer text from a different domain than the historical digital documents.

13. A computerized method in which unstructured computer text is analyzed for generation of customized digital documents, the method comprising:
receiving, by a server computing device from a computer data store, (i) a plurality of historical user interactions each associated with a user, each historical user interaction comprising a plurality of data fields, and (ii) a plurality of historical digital documents corresponding to the plurality of historical user interactions, each historical digital document comprising a corpus of unstructured computer text;
tokenizing, by the server computing device, each historical user interaction and each historical digital document into a set of tokens using a byte pair encoder;
encoding, by the server computing device, each set of tokens for the historical user interaction and the historical digital document into a multidimensional vector;
training, by the server computing device, an interaction classification model using the multidimensional vectors as input, the trained interaction classification model configured to generate a digital document classification for an input user interaction;
training, by the server computing device, a language generation model using the multidimensional vectors as input, the trained language generation model configured to generate a customized digital document based upon an input user interaction;
receiving, by the server computing device, a new user interaction associated with a user of a client computing device;
tokenizing, by the server computing device, the new user interaction into a new set of tokens and encoding the new user interaction into a new multidimensional vector based upon the new set of tokens;
executing, by the server computing device, the trained interaction classification model using the new multidimensional vector as input to generate a digital document classification for the new multidimensional vector;
executing, by the server computing device, the trained language generation model using the new multidimensional vector and the digital document classification for the new multidimensional vector as input to generate a customized digital document for the user of the client computing device; and
transmitting, by the server computing device, the customized digital document to the client computing device for display to the user of the client computing device.

14. The method of claim 13, wherein encoding each set of tokens for the historical user interaction and the historical digital document into a multidimensional vector comprises one or more of: removing one or more stopwords from the historical user interaction or the historical digital document, or removing one or more symbols or digits from the historical user interaction or the historical digital document.

15. The method of claim 14, wherein the historical user interaction comprises a plurality of data fields including a description field, a resolution field, a client name field, and a date field.

16. The method of claim 15, wherein the server computing device uses a word embedding algorithm to encode each set of tokens for the historical user interaction and the historical digital document.

17. The method of claim 13, wherein the interaction classification model comprises a neural network having an input layer, one or more hidden layers, and an output layer.

18. The method of claim 13, wherein encoding the set of tokens for the new user interaction into the new multidimensional vector comprises one or more of: removing one or more stopwords from the new user interaction, or removing one or more symbols or digits from the new user interaction.

19. The method of claim 18, wherein the new user interaction comprises a plurality of data fields including a description field, a resolution field, a client name field, and a date field.

20. The method of claim 18, wherein the server computing device uses a word embedding algorithm to encode the new set of tokens for the new user interaction.

21. The method of claim 13, wherein executing the trained interaction classification model using the new multidimensional vector as input to generate a digital document classification for the new multidimensional vector comprises:
predicting a classification score for the new user interaction based upon one or more features of the new multidimensional vector; and
assigning a digital document classification to the new user interaction based upon the classification score.

22. The method of claim 13, wherein executing the trained language generation model using the new multidimensional vector and the digital document classification for the new multidimensional vector as input to generate a customized digital document for the user of the client computing device comprises:
determining a sequence of words that comprise the customized digital document based upon the new multidimensional vector, including selecting a plurality of candidate words to be included as a next word in the sequence of words and determining the next word in the sequence of words by evaluating a score associated with each candidate word.

23. The method of claim 22, wherein the language generation model is a generative pretrained transformer.

24. The method of claim 13, wherein the language generation model is trained using transfer learning techniques based upon a corpus of unstructured computer text from a different domain than the historical digital documents.

* * * * *